Patented May 6, 1924.

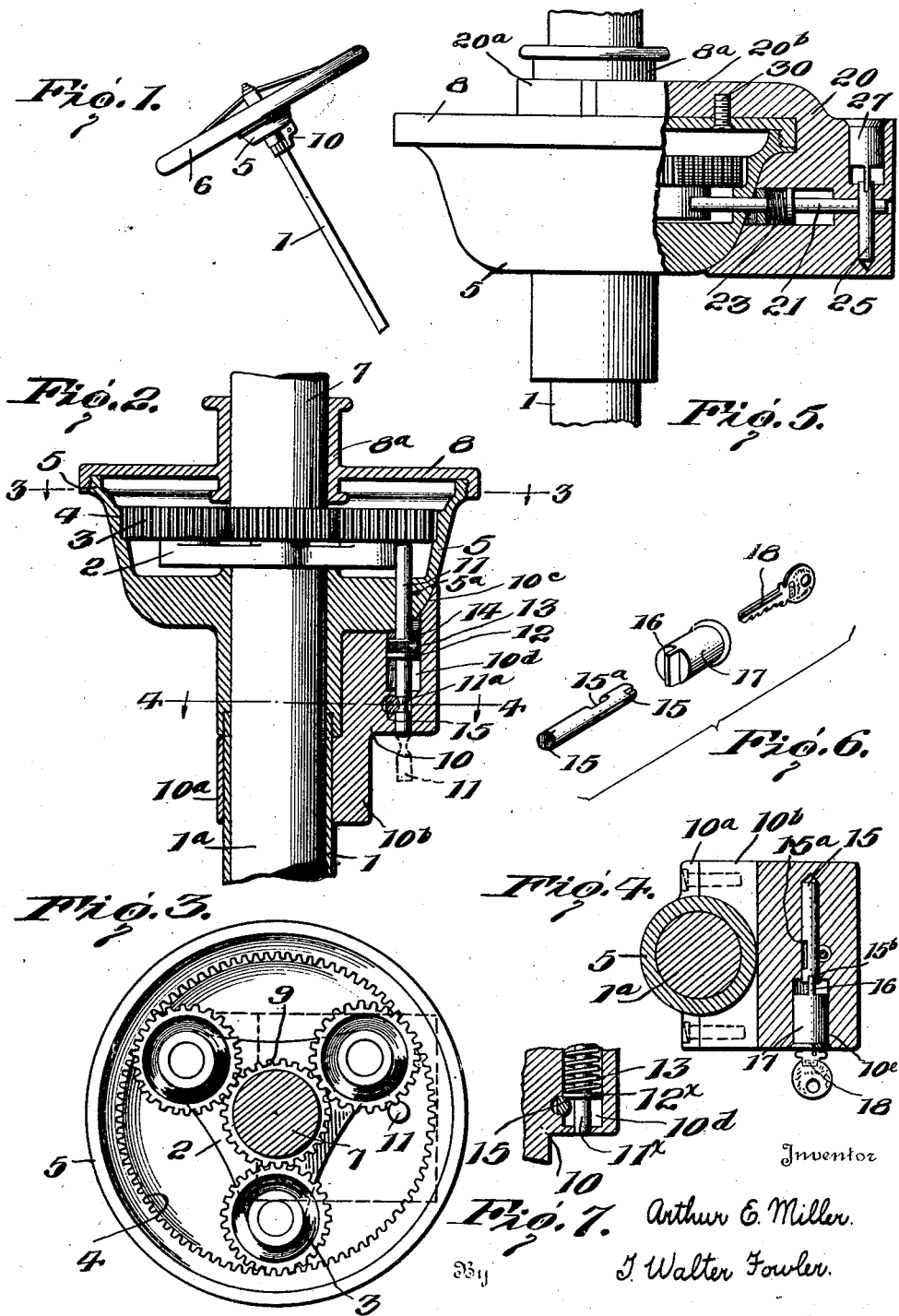

1,493,122

UNITED STATES PATENT OFFICE.

ARTHUR E. MILLER, OF SACRAMENTO, CALIFORNIA.

LOCKING DEVICE FOR VEHICLES.

Application filed October 24, 1921. Serial No. 509,901.

*To all whom it may concern:*

Be it known that I, ARTHUR E. MILLER, a citizen of the United States, residing at Sacramento, in the county of Sacramento and State of California, have invented certain new and useful Improvements in Locking Devices for Vehicles, of which the following is a specification.

The present invention has reference to a vehicle lock particularly, although not necessarily, adapted and constructed for use upon automobiles of the well known Ford type, which embodies a peculiar and characteristic arrangement of steering mechanism, differing from the more common forms, and which peculiar steering mechanism requires especial consideration in adapting a satisfactory and efficient vehicle lock to the same.

One of the objects of the present invention is the provision of a lock for vehicles of this type, which is adapted to lock into a portion of the steering mechanism of the vehicle, and when so locked to prevent extended operation of the vehicle, but at the same time permitting a limited amount of movement of the steering mechanism to enable the vehicle to be moved within a set range in the event of emergency.

A further object of the invention is the provision of a lock for these vehicles which is so constructed that the parts of the same are entirely enclosed so that they are inaccessible and cannot be tampered with in the attempt to avoid the lock.

With the above and other objects in view the invention consists in the parts and combinations of parts to be hereinafter described and claimed.

In the drawings:—

Fig. 1 is a view in elevation of the steering mechanism of a vehicle;

Fig. 2 is a vertical section through a portion of said steering mechanism and the attached locking device;

Fig. 3 is a horizontal section on the line 3—3 of Fig. 2;

Fig. 4 is a section on the line 4—4 of Fig. 2;

Fig. 5 is an elevation partly in section showing a modified form of the invention;

Fig. 6 is a perspective view of certain of the locking parts; and

Fig. 7 is a fragmental vertical section of modified forms of said locking parts.

The present invention will be described with reference to its adaptation to a steering mechanism of the well known Ford automobile, but it is to be understood that the invention is not limited to such particular use, but may well be used upon other types of vehicles which may have parts similar to or the equivalent of the parts of the steering mechanism more particularly found in the Ford type of automobile. The steering mechanism proper comprises in the present instance a steering post 1 which extends from the steering wheel to suitable connections with the wheels of the vehicle, the said steering post being enclosed within the usual steering column $1^a$. The post carries at its upper end a three armed spider 2 rigidly attached thereto, and on each arm of the spider is mounted a pinion 3, having gear teeth which mesh with corresponding teeth 4 formed in the interior wall of the housing member 5 which contains this portion of the steering mechanism. The usual steering wheel 6 is provided, this wheel carrying a shaft 7 which extends through the upper housing member 8 and carries at its lower end a gear wheel 9, which is mounted in the center of the housing between the several pinions 3, as clearly shown in Fig. 3. The operation of this mechanism is thought to be well known and need only be described in brief detail. Movement of the steering wheel 6 imparts like movement to the shaft 7 carrying the gear wheel 9 and rotation of the gear wheel 9 is correspondingly imparted to the several pinions 3, which will revolve, and which being in mesh with the gear teeth 4 formed in the wall of the housing will cause said pinions to travel upon the housing in the direction of rotation of the shaft 7, and thereby cause a movement of the spider 3 and in turn the post 1 in the same direction of rotation as the steering wheel 6. The steering mechanism described is common to vehicles of the Ford type, and forms no part of the present invention.

In order to lock the steering mechanism thus described, peculiar conditions must be contended with, and the present lock is devised with the idea of forming the most satisfactory means for accomplishing the safe and efficient locking of these parts. In the present instance a lock casing 10 is mounted upon the steering column $1^a$, the lower portion of said casing comprising two sleeves 10ª and 10ᵇ, which surround the column and are joined together by suitable one-way screws or connections. The upper portion of the casing 10, is shaped at 10ᶜ to conform to the exterior of the housing 5, and a recess 10ᵈ is formed in the casing to receive a portion of the lock mechanism. A locking bolt 11, having its lower portion mounted in and through the lock casing 10, projects through a suitable opening 5ª into the housing 5, wherein is mounted the steering mechanism previously described. A washer 12 is fixedly mounted upon the locking bolt 11, and a coiled spring 13 bears against one side of this washer, the opposite end of the spring bearing against a second washer 14 fixedly mounted within and to the casing 10, the purpose of the spring being to impel the locking bolt 11 downwardly upon the release of the means retaining the locking bolt in its upward position. Near its lower end the locking bolt 11 is channeled at 11ª around its periphery, and a locking pin 15 is adapted to enter the channel 11ª to retain the bolt against movement. The locking pin 15 is cut away on one side at 15ª at a point opposite the channeled portion 11ª of the bolt 11 when the latter is in the upward position. One end of the pin 15 has a slot 15ᵇ cut therein, which receives a fin 16 carried by a suitable lock 17, the fin 16 being operated by the lock upon insertion and revolution of a suitable key 18 in a keyway provided in the lock.

In the use and operation of the present locking device, when the vehicle is being driven and used by the owner, the locking bolt 11 will be in the lowermost position shown by dotted lines in Fig. 2, the lower end of said bolt projecting out of the face of the casing 10, and the upper end of the bolt being below the level of the spider 2. The steering mechanism can then be operated in the usual manner without interference. When the owner of the vehicle desires to lock the same, he will press with his finger upon the lower end of the locking bolt 11, forcing said bolt upwardly against the tension of the spring 13, until the lower end of the bolt is flush with the face of the casing 10. The upper end of the bolt 11 will now be in the projected position shown in full lines in Fig. 2, and will be disposed between the arms 2 of the spider, and in the path of movement of such arms, as shown in Fig. 3. With the parts in this position the owner of the vehicle will insert a key into the lock 17, and give said key a half turn in either direction, which will cause a corresponding turning movement of the fin 16 and in turn the locking pin 15, which will be turned from a position with the indentation 15ª opposite the channel 11ª to a position wherein the opposite rounded side of said pin will enter into and engage the channel 11ª in the locking bolt as shown in Figs. 2 and 4. The key is now withdrawn from the lock and the parts are firmly locked in position. It will be seen that it will be impossible to move the steering mechanism except through a small range, since the locking bolt 11 will act as a stop, abutting either of the adjacent arms of the spider 2 between which it is placed when an attempt is made to turn the spider. The locking device will be so placed upon the steering mechanism that it may be locked with the wheels of the vehicle turned to either right or left, preferably left, of straight forward position, and further so arranged, in the event the wheels are turned to the left of normal, that one of the arms of the spider will abut against the locking bolt 11 upon an attempt to turn the mechanism to the right. At the same time it is possible to turn the wheels to the left until the next arm of the spider abuts against the locking bolt. With this arrangement it is never possible to bring the wheels of the vehicle to a forward position, or to a position to the right of forward, but it is still possible to manipulate them slightly toward the left, so that in case of emergency the vehicle may be moved away from the place at which it was parked. It will be noted that in the attempt of an unauthorized person to steal the car, the attempt would be frustrated by the fact that the vehicle would always run in a circle to the left of its position, and could not be driven forward.

When the vehicle is to be unlocked, the key 18 is inserted in the lock 17, and given a half turn in either direction, which will cause a rotation of the locking pin 15 and will remove the rounded side of said pin from the channel portion 11ª of the locking bolt, and will cause the indentation 15ª in the pin to turn toward the bolt 11. As soon as the rounded side of the pin has left the channel 11ª, the bolt will be released, and the tension of the spring 13 will cause the bolt to be projected downwardly to the position of dotted lines in Fig. 2, with its upper end clear of the spider 2.

In the modified form of the invention shown in Fig. 5, the lock casing 20 is mounted in different position upon the steering mechanism, the upper portion of the casing comprising an arm 20ᵇ which lies upon the upper surface of the housing 8, the end of said arm having a recess therein, which in conjunction with a sleeve 20ª will surround the sleeve portion 8ª of the housing 8, the two members 20ª, 20ᵇ being united by a suitable means as described with reference to the preferred form. In the modified form, a locking bolt 21 is used, which enters the housing 5 from the side, and which may have its inner end in the path of movement of the arms of the spider 2. A spring 23 is used in the same manner as described with reference to the preferred form, and likewise a locking pin 25, and lock 27 are provided, which operate in the manner described with reference to the preferred form of the invention. The distinction of the modified form thus described is that the locking bolt enters the housing 5 from the side thereof and projects in the path of movement of the spider at right angles to the axis of the same. It will be noted that the lock casing shown in Fig. 5 is so constructed that it overlies both portions 5 and 8 of the housing, and by its construction prevents separation of said members while the locking device is in position. If desired, a suitable set screw 30 may be provided which will enter the portion 20$^b$ of the lock casing and housing 8 together. The operation of the device shown in Fig. 5 is similar to that described with reference to the preferred form, and such description need not be repeated at this time.

The modified form of locking bolt shown in Fig. 7 may be used in lieu of that described, the bolt 11$^x$ in this instance having the channeled portion omitted and having the washer 12$^x$ nearer midway of its length. The locking pin 15 engages one side of the washer 12$^x$ when it is turned to lock position, and the coiled spring 13 described with reference to the preferred form will bear against the opposite side of the washer.

The present locking device, in either of its forms will be found to provide a particularly efficient means for locking the mechanism of an automobile having the type of steering mechanism described. The locking device will be found to be safe against tampering for the purpose of avoiding the lock, and will further be of advantage in that it does not engage any portion of the steering mechanism which might be damaged or broken as happens in several forms of prior locks for the steering mechanism of this type of automobile, wherein a locking device was adapted to engage the teeth of one of the pinions 3, with the result that when an attempt is made to force the mechanism, the teeth of the pinions are mutilated, and the steering mechanism damaged so that it will not thereafter operate without repair. The present locking device is economical in manufacture, and readily applied to the steering mechanism now in use. I have shown a key lock of well known construction as a means for causing actuation of the locking pin 15, and such disclosure is made for purposes of illustration only, since the particular form of lock used is immaterial, and in place of the form illustrated I can well use a combination lock, or a key lock of different construction. It will be understood that the present device is subject to such variation and change as may be found desirable within the scope of the appended claims.

Having thus described my invention, what I claim as new and desire to secure by Letters Patent is:—

1. In a vehicle having a steering mechanism comprising in part a casing having therein planetary gearing, portions of which are mounted upon a rotatable spider, a lock for said mechanism comprising a casing adjacent the mechanism; a lock bolt mounted in said casing adapted to project into the path of the arms of said spider so as to be engaged by the said arms upon movement of the latter; and means for retaining said bolt in the projected position.

2. A vehicle steering mechanism comprising a series of rotatable parts one of said parts consisting of a spider; and the combination with said mechanism of a locking device comprising a casing fixed to a rigid portion of the vehicle adjacent said mechanism, a locking bolt in said casing adapted to be projected into the path of the arms of said spider so as to be engaged by the said arms upon movement of the latter to limit the movement of the latter in either direction of rotation; and means for retaining said bolt in the projected position.

3. A locking device for a vehicle wherein the steering mechanism comprises in part a rotatable spider having a series of pinions mounted therein, said locking device comprising a casing fixed to a rigid portion of the vehicle adjacent the said spider; a locking bolt carried by said casing and adapted to be projected into the path of rotation of the arms of said spider so as to be engaged by the said arms upon movement of the latter to limit the movement of the latter in either direction; locking means for retaining said bolt in the projected position; and means for withdrawing said locking bolt from said projected position.

4. A locking device for a vehicle, the steering mechanism of which comprises in part a rotatable spider, said locking device comprising a casing adapted to be fixedly mounted approximate the spider; a locking bolt in said casing adapted to be projected between the arms of said spider and in the path of movement of the same so as to be engaged by said arms upon movement of the latter; lock means for retaining said bolt in the projected position; and a spring for withdrawing said blot upon release of said lock means.

5. A locking device for a vehicle, the steering mechanism of which comprises in part a rotatable spider, said locking device comprising a casing adapted to be fixedly attached to a portion of the vehicle adjacent said spider; a locking bolt in said casing adapted to be projected into the path of movement of the arms of said spider; a locking pin adapted to engage said locking bolt to retain the latter in the projected position; and a spring for withdrawing said bolt from its projected position upon release of said pin.

6. A locking device for a vehicle, the steering mechanism of which comprises in part a rotatable spider, said locking device comprising a casing adapted to be fixedly attached to a portion of the vehicle approximate the spider; a locking bolt in the casing adapted to project between the arms of said spider and in the path of movement thereof to limit but not prevent movement of said spider in either direction; a locking pin adapted to engage said bolt when the latter is in the projected position; a lock controlling the movement of said pin; and a spring for withdrawing said bolt from projected position upon release of said pin from engagement therewith.

7. A locking device for a vehicle, the steering mechanism of which comprises in part a rotatable spider, said locking device comprising a casing adapted to be fixedly attached to a portion of the vehicle approximate said spider; a locking bolt carried by said casing adapted to be projected between the arms of said spider and in the path of movement thereof; a locking pin at right angles to said bolt, said locking pin having a portion adapted to engage the bolt to retain the latter in its projected position; a lock; means whereby actuation of the lock controls the movement of said pin; and a spring bearing against a portion of said bolt to cause the withdrawal of the latter from projected position upon release of the pin from engagement with the bolt.

In testimony whereof I hereunto affix my signature.

ARTHUR E. MILLER.